Nov. 13, 1962 F. L. SCHLAPPAL 3,063,318
SKIVING TOOL HOLDER

Filed Oct. 6, 1958 2 Sheets-Sheet 1

FIG. I

INVENTOR.
FRANK L. SCHLAPPAL.
BY *Pyle & Fisher*
ATTORNEYS

Nov. 13, 1962     F. L. SCHLAPPAL     3,063,318
SKIVING TOOL HOLDER
Filed Oct. 6, 1958     2 Sheets-Sheet 2

INVENTOR.
FRANK L. SCHLAPPAL
BY Pyle & Fisher
ATTORNEYS

3,063,318
SKIVING TOOL HOLDER
Frank L. Schlappal, 1058 Case Ave., Mentor, Ohio
Filed Oct. 6, 1958, Ser. No. 765,640
2 Claims. (Cl. 82—36)

This invention pertains to tool holders and more particularly to that class of tool holders known as "Skiving Tool Holders."

Skiving is a known metal working technique which in the past has had little use. The skiving technique utilizes a cutting tool having an elongated cutting edge which is shaped to form an infinite number of tangents to the finished surface of a workpiece to be machined to a circular cross section. Thus, the skiving tool is shaped to the contour of the surface to be formed.

The elongated cutting edge of a skiving tool is disposed at an angular but parallel relationship to the axis of a workpiece. The workpiece is rotated and the skiving tool is slowly advanced. The cutting edge first contacts the workpiece at one end. The tool is then advanced along a rectilinear path which is essentially normal to the axis of the rotating object, and since the cutting edge is at an angle to the axis, the cutting operation gradually advances, axially speaking, from one end to the other. Thus, with one pass of the skiving tool the work piece is shaped to the desired finished shape by the pre-formed shape of the skiving tool.

Heretofore this technique, though extremely economical in use once the tool has been set up, has had very limited use. One of the principal reasons for the limited use is that a skiving tool must be carefully adjusted and prior known skiving tool holders required long and arduous set ups.

Accordingly, one of the principal objects of the present invention is to provide a novel and improved tool holder which has only two adjustments.

A related object to the invention is to provide a novel and improved skiving tool holder which is simple and quick to set up, which provides a simplified operation, and which provides improved skiving operations at lower costs.

A more specific object of the invention is to provide a novel and improved skiving tool holder which has a rotative adjustment transverse to the elongated skiving tool cutting edge, and a rectilinear adjustment which is transverse to both the axis of rotative adjustment and to the cutting tool edge.

A related and more specific object of the invention is to provide a novel and improved skiving tool made in accordance with the foregoing objectives in which the adjustments are micrometer adjustments.

Other objects and a fuller understanding of the invention may be had by referring to the following description and claims, taken in conjunction with the accompanying drawings, in which:

Figure 1:
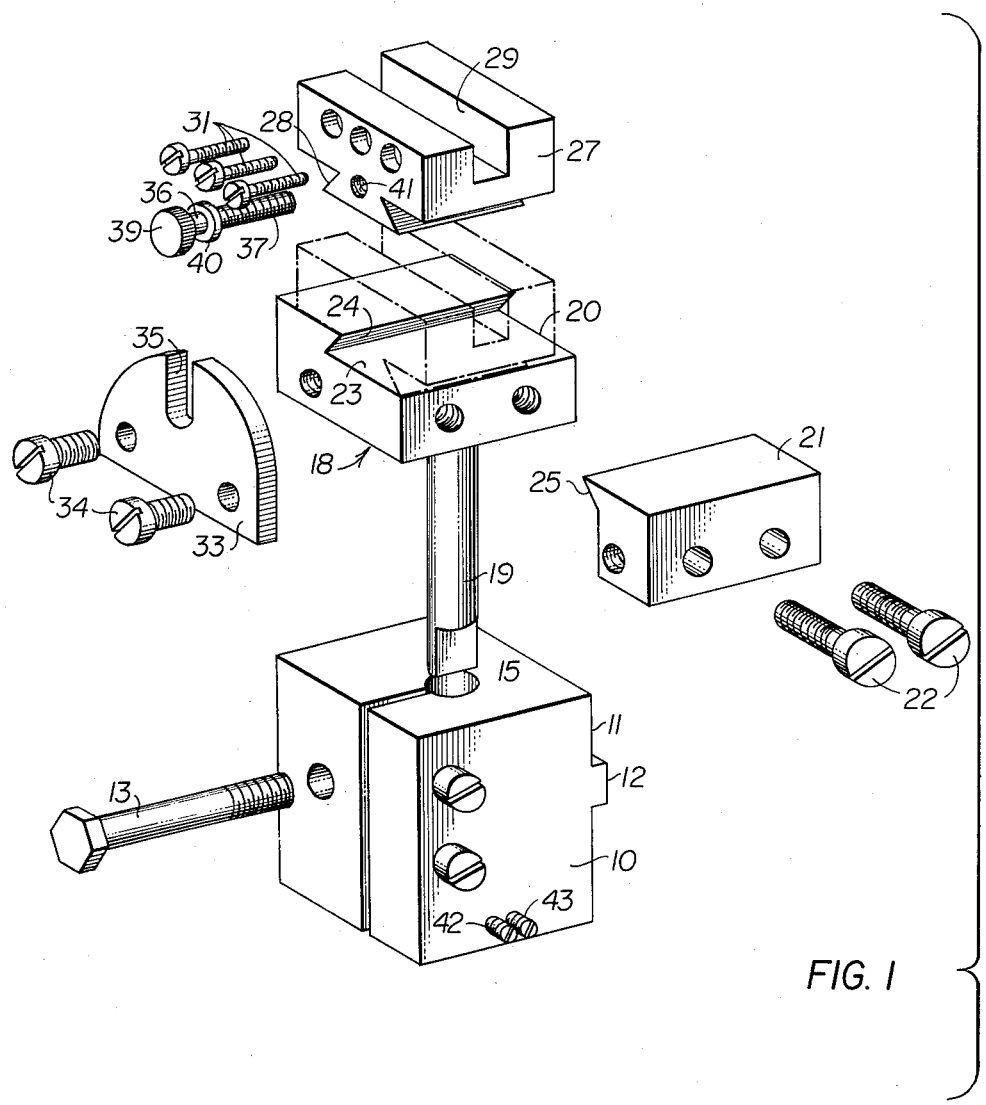
FIGURE 1 is an exploded view of the novel and improved skiving tool.
Figure 2:
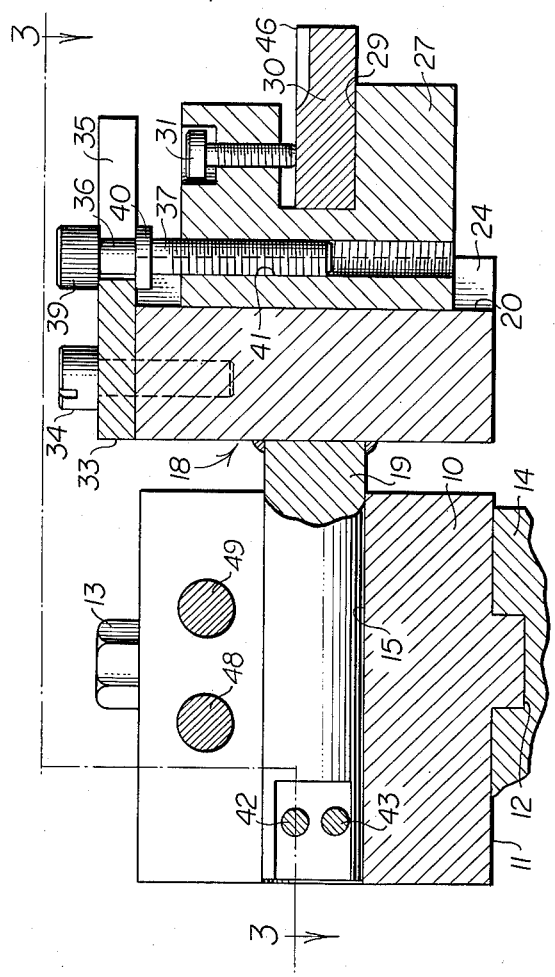
FIGURE 2 is a sectional view as seen from the plane indicated by the line 2—2 of FIGURE 3 of the device in an assembled condition and on a reduced scale with respect to FIGURE 1.

Referring to the drawings, a pillow block is shown at 10. The pillow block 10 has a lower surface 11 which preferably abuts against a machine tool when the skiving tool holder is in use. A fragmentary portion of the machine tool bed is indicated at 14, FIGURE 2. The machine tool contacting surface 11 may include a locating projection 12 which fits a mating slot formed in the surface of the machine tool to hold the pillow block in a located position. The pillow block is suitably fastened to the machine tool as by a bolt 13 which may thread into the machine tool.

The pillow block 10 has a longitudinally extending throughbore 15. The bore 15, as disclosed, is preferably cylindrical and horizontally disposed when the device is in use.

A tool support member is shown generally at 18. The tool support includes an elongated extension 19 which is a support bar or shank. The support bar 19 is preferably cylindrical in contour. The support bar 19 fits snugly into the pillow block bore or passage 15.

The support member 18 has a sectioned guide body 20 at one end thereof. The guide body 20 includes as one of the sections a removable end part 21 which is suitably fixed to the remainder of the guide body 20 as by bolts 22. The guide body 20 includes a dovetail in the form of an elongated open slot 23 having inwardly inclined side surfaces 24, 25 respectively. A tool clamp member 27 has a guide projection 28 which fits snugly into the dovetail 23. The clamp section 27 has an elongated slot 29 which receives a cutting tool 30 shaped suitably for a skiving operation. Suitable tool clamp screws 31 are provided to clamp the skiving tool 30 in the slot 29. The cutting or skiving tool 30 has a cutting edge 46 along the juncture of the front wall of the tool and a shaped top surface seen in plan view in FIGURE 3.

A slotted adjustment plate 33 is fixed to the top of the guide body 20, as by screws 34. The adjustment plate 33 has an elongated slot 35 which receives a guide portion 36 of a tool adjustment screw 37. The axial extremities of the guide portion 36 are defined by a knurled head 39 and an annular abutment shoulder 40. The guide portion 36 of the tool adjustment screw 37 is positioned in the guide slot 35, and the head 39 and the shoulder 40 are disposed on either side of the adjustment plate 33 to prevent axial movement on the tool adjustment screw relative to the adjustment plate.

The tool adjustment screw 37 threads into a threaded aperture 41 in the tool clamp member 27. Rotation of the tool adjustment screw 37 shifts the tool clamp member 27 up and down along a rectilinear path in the dovetail. The path is preferably vertical. When the tool clamp member 27 has been shifted by rotation of the adjustment screw 37 to the desired vertical position, the bolts 22 may be tightened to clamp the sections of the guide body 20 together with the member 27 in the desired position relative to the body.

One of the outstanding advantages of the invention is that only one adjustment is needed in addition to the vertical adjustment provided by the adjustment screw 37. This adjustment is achieved by rotating the support member 18 relative to the pillow block 10. This rotation is achieved by adjusting first and second rotation adjustment screws 42, 43 which are threaded into the pillow block 10. The adjustment screws 42, 43 contact a flat 44 formed at one end of the pivot bar 19. It will be seen that the adjustment screws 42, 43 are disclosed on either side of a horizontal plane which includes the axis of the bar 19 when the tool is mounted with the bar in a horizontal plane. Thus, the adjustment screws are located on either side of the plane which includes the axis of the bar 19 and manipulation of these screws will cause rotation of the bar and the connected tool 30. The rotational adjustment permits the cutting tool 30 to have its slanted cutting edge 46 positioned in a plane which is parallel to the axis of a workpiece.

The pillow block includes a longitudinally extending slot 50 which communicates with the bore 15 preferably over the majority of the length of the bore to divide a portion of the block into upper and lower spring sections. Once the appropriate alignment has obtained between the cutting tool edge 46 and the axis of the workpiece, clamp screws 48, 49 are tightened down to bring the spring sections together and close the slot 50 in the pillow block 10. The closing of the slot 50 permits the pillow block aperture 15 to be distorted inwardly to clamp against the bar 19.

Figure 3:
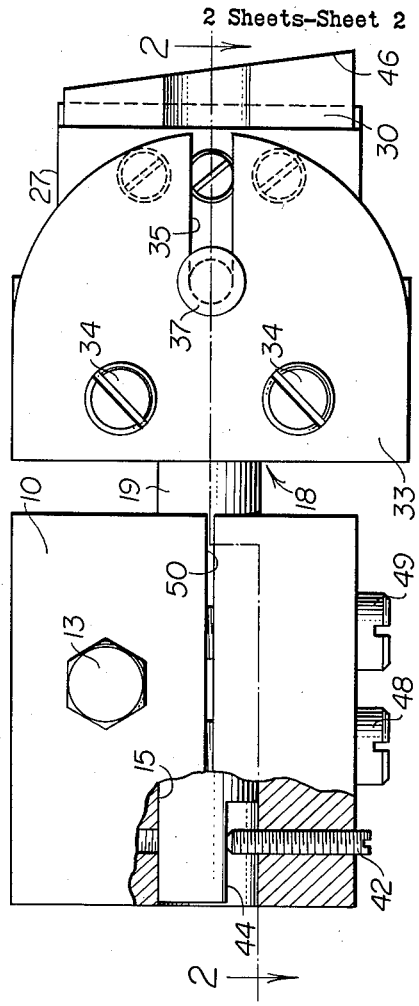
FIGURE 3 is a top plan view of the assembled tool holder.

Reference to FIGURE 3 will show that the cutting edge 46 of the skiving tool slants across the axis of tool holder rotative adjustment. This is provided so that in a skiving type cutting operation the actual cutting advances from right to left, as seen in FIGURE 3, as the tool is advanced relative to the workpiece. Thus, the right-hand side of the cutting tool may be considered to be a leading edge and the left-hand side a trailing edge. This slant of the cutting edge 46 is from an outermost remote location at the leading edge to an inward location at the trailing edge.

One of the advantages of the invention is that as the cutting tool becomes worn and is resharpened, the entire tool support member 18 may be advanced relative to the pillow block 10 by simply loosening the clamp screws 48, 49 and sliding the member 18 forward.

One of the outstanding features of the invention is that the two adjustments; that is, the vertical adjustment of the clamp member 27 and the connected tool 30 and the rotational adjustment of the bar or shank 19; both have micrometer adjustments. Very delicate movement of the adjustment screws 37, 42, and 43 can be obtained. After the delicate adjustment has been made, the device can be clamped together to lock the cutting tool in its adjusted position.

While the invention has been described with a great deal of clarity and detail, it is believed that it essentially comprises a tool holder having a pillow block member and a tool support member carried by it and in which the tool support member is rotatable relative to the pillow block for one adjustment and the tool support has a tool clamp member at the one end which holds the tool in a fashion which permits adjustment along a rectilinear path transverse to the rotational adjustment.

Alhough the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A tool holder comprising, a pillow block, means to connect the block to a machine tool, said block having a through bore formed therein, a tool support having an elongated circular shank, a substantial portion of said shank being snugly disposed in said bore, said block having an elongated slot communicating with said bore through at least a major portion of the length thereof, said block including a spring portion having a wall section defining a side wall of said slot, said shank having a flat formed at one end thereof, first and second micrometer adjustment screws threaded into the block and engaging said flat to rotatively adjust said shank relative to the block, said screws being disposed on either sides of a plane which includes the shank axis, clamp screw means threaded into said block and passing through said slot to selectively bend said spring portion and narrow said slot to clamp the shank in an adjusted position, said support having a guide body at the other end thereof, the guide body having a dovetail disposed transversely to the axis of the shank, the guide body comprising a plurality of sections, dovetail clamp screws threaded into one of said sections to draw said sections together selectively, a sliding tool clamp having surfaces interlocking with said dovetail for relative movement along a rectilinear path defined by the dovetail and transverse to said shank axis said block and said bodies each having substantial mass and greater vertical and width dimensions than said tool clamp whereby to support the clamp against torsional forces when the device is in use, said clamp including a tool receiving slot, a cutting tool carried by said clamp and abutting a rear wal lof said slot, said tool having an elongated cutting edge disposed transversely to both said shank axis and said path, a tool adjustment screw having an axis disposed along said path, a slotted adjustment plate connected to said dovetail, said tool adjustment screw being rotatably disposed in said plate slot, said tool adjustment screw having a head and a shoulder disposed on either side of said plate to prevent axial movement of the screw relative to the plate, and said tool adjustment screw being threadably connected to said clamp to cause said support member to move along said path on rotation of said tool adjustment screw.

2. In combination,
a pillow block, a tool support rotatably carried by the block and having a guide body at the outer end thereof,
said support being rotatable about an axis and relative to said block to adjust the relative positions of the block and support,
clamping means for fixing the tool support and the block together in a selected and adjusted position,
a tool clamp slidably carried by the body and having vertical and transverse dimensions less than the body and the block and said body and block having substantial mass whereby the body and block support the clamp against torsional forces,
a skiving tool carried by the clamp and having a top surface shaped to the contour of an object to be formed,
said tool having front and back surfaces,
said tool having a cutting edge disposed along the juncture along the front and the shaped surfaces,
said tool being clamped in the tool clamp with the cutting edge remote from the clamp and the back of the tool in supporting abutment with the clamp to provide rigidity and support against torsional forces,
said cutting edge being disposed transversely about the axis of rotation, and adjustment means for selectively adjusting the tool and clamp relative to the body and the block along a rectilinear path transverse the cutting edge and the axis of rotation.

References Cited in the file of this patent

UNITED STATES PATENTS

| 1,830,027 | Hayden | Nov. 3, 1931 |
| 1,858,754 | Tessky | May 17, 1932 |
| 2,127,523 | Krans | Aug. 23, 1938 |
| 2,368,736 | Wyrick | Feb. 6, 1945 |
| 2,413,406 | Dooling | Dec. 31, 1946 |
| 2,466,596 | Krause | Apr. 5, 1949 |
| 2,684,608 | Roman | July 27, 1954 |
| 2,848,918 | Lustrik | Aug. 26, 1958 |
| 2,908,963 | Gollus | Oct. 20, 1959 |

FOREIGN PATENTS

| 552,771 | Great Britain | Apr. 21, 1943 |
| 984,536 | France | Feb. 28, 1951 |
| 438,968 | France | Mar. 28, 1912 |